US009519850B2

(12) United States Patent
Minegishi et al.

(10) Patent No.: US 9,519,850 B2
(45) Date of Patent: Dec. 13, 2016

(54) COMPUTER-READABLE RECORDING MEDIUM, INFORMATION PROCESSING APPARATUS, AND PRINTING SYSTEM

(71) Applicants: Saori Minegishi, Kanagawa (JP); Yuuki Hirano, Kanagawa (JP)

(72) Inventors: Saori Minegishi, Kanagawa (JP); Yuuki Hirano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 204 days.

(21) Appl. No.: 13/848,311

(22) Filed: Mar. 21, 2013

(65) Prior Publication Data
US 2013/0250361 A1 Sep. 26, 2013

(30) Foreign Application Priority Data

Mar. 21, 2012 (JP) .................... 2012-063524
Oct. 1, 2012 (JP) .................... 2012-219889

(51) Int. Cl.
G06K 15/00 (2006.01)
G06K 15/02 (2006.01)
G06F 3/12 (2006.01)

(52) U.S. Cl.
CPC ......... *G06K 15/1848* (2013.01); *G06F 3/1205* (2013.01); *G06F 3/1252* (2013.01); *G06F 3/1285* (2013.01); *G06F 2206/1514* (2013.01)

(58) Field of Classification Search
CPC .. G06K 15/1848; G06F 3/1205; G06F 3/1285; G06F 3/1252
See application file for complete search history.

(56) References Cited

U.S. PATENT DOCUMENTS 8,438,478 B2 * 5/2013 Takami et al. ............... 715/274
2007/0139707 A1 6/2007 Takami et al.
(Continued)

FOREIGN PATENT DOCUMENTS

CN 102348032 A 2/2012
JP 2005-12413 1/2005
(Continued)

OTHER PUBLICATIONS

Office Action issued Jul. 3, 2015 in Chinese Patent Application No. 201310092406.2 (with English translation).
(Continued)

*Primary Examiner* — Marivelisse Santiago Cordero
*Assistant Examiner* — Neil R McLean
(74) *Attorney, Agent, or Firm* — Oblon, McClelland, Maier & Neustadt, L.L.P.

(57) ABSTRACT

In the invention, an information processing apparatus comprises: a document data receiving unit configured to receive document data of a plurality of pages to be printed; a setting information receiving unit configured to receive special duplex printing in which a page layout manner differs on a first side and a second side in setting information used for performing printing; and a print data generating unit configured to produce print data in which the pages are laid out on the first side in a first layout manner and on the second side in a second layout manner different from the first layout manner as the print data for causing a printing apparatus to print the document data received by the document data receiving unit, when the special duplex printing is set in the setting information received by the setting information receiving unit.

20 Claims, 13 Drawing Sheets

(56) References Cited

U.S. PATENT DOCUMENTS

| | | | |
|---|---|---|---|
| 2008/0225346 A1* | 9/2008 | Mano | H04N 1/40 |
| | | | 358/448 |
| 2010/0245872 A1* | 9/2010 | Narita | 358/1.9 |
| 2011/0032562 A1* | 2/2011 | McCuen et al. | 358/1.15 |
| 2011/0228323 A1* | 9/2011 | Oshima | 358/1.15 |
| 2011/0286034 A1 | 11/2011 | Hirano | |
| 2012/0026515 A1* | 2/2012 | Muramoto | 358/1.2 |
| 2012/0105891 A1 | 5/2012 | Mano et al. | |
| 2012/0120440 A1 | 5/2012 | Ueda | |

FOREIGN PATENT DOCUMENTS

| | | |
|---|---|---|
| JP | 2008-226050 | 9/2008 |
| JP | 2008-305417 | 12/2008 |
| JP | 2009-064266 | 3/2009 |
| JP | 2009-124609 | 6/2009 |
| JP | 2010-30079 | 2/2010 |
| JP | 2010-237749 | 10/2010 |
| JP | 2012-34008 | 2/2012 |

OTHER PUBLICATIONS

Office Action issued Aug. 16, 2016, in Japanese Patent Application No. 2012-219889.

* cited by examiner

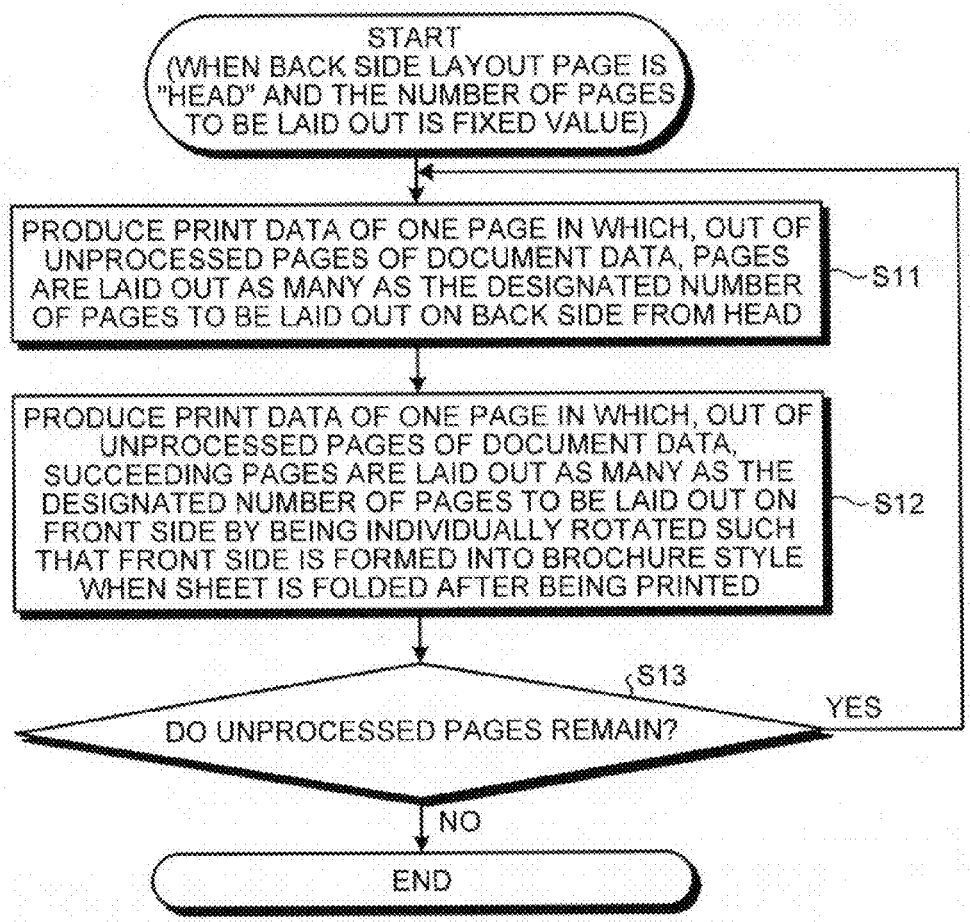

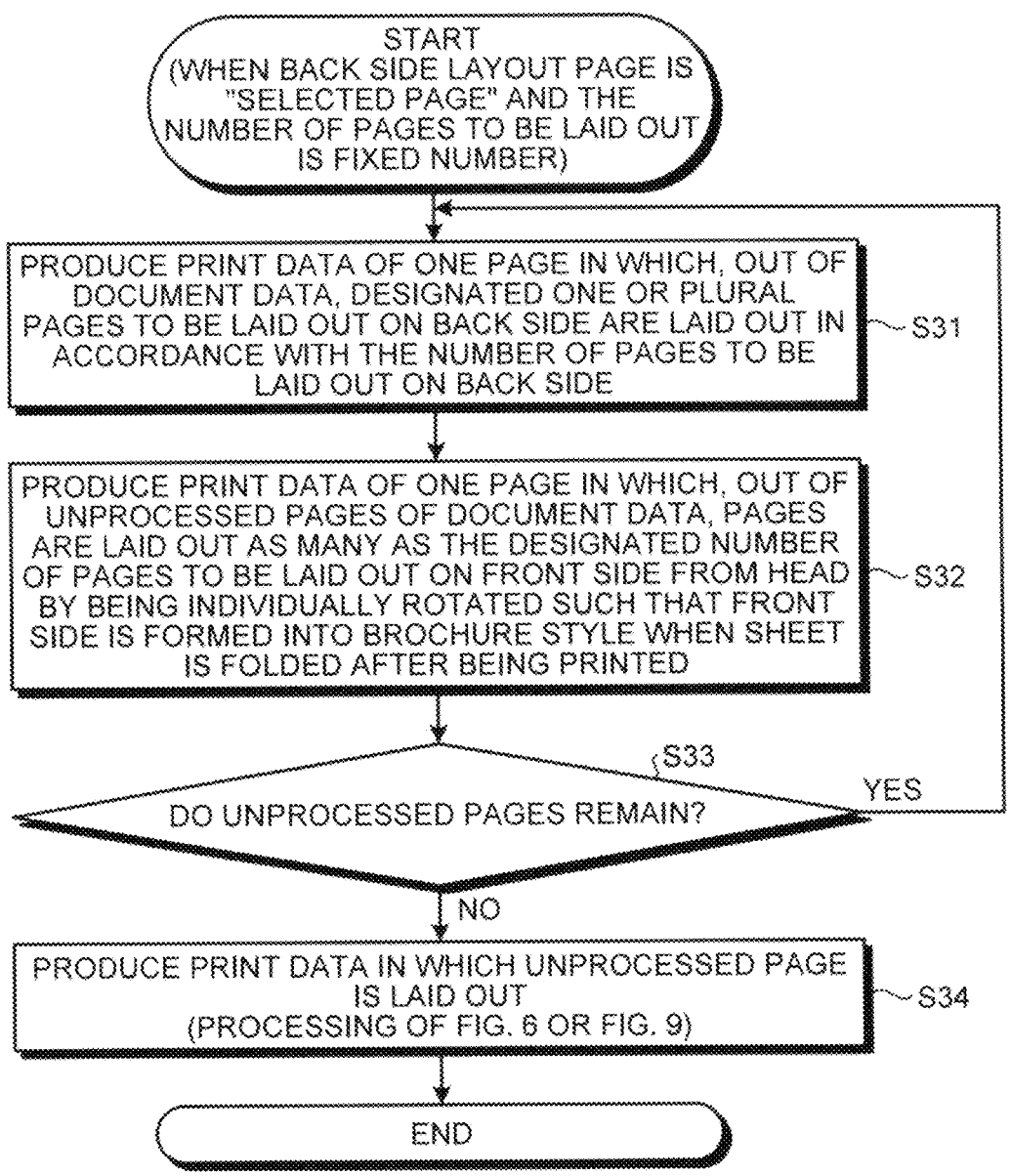

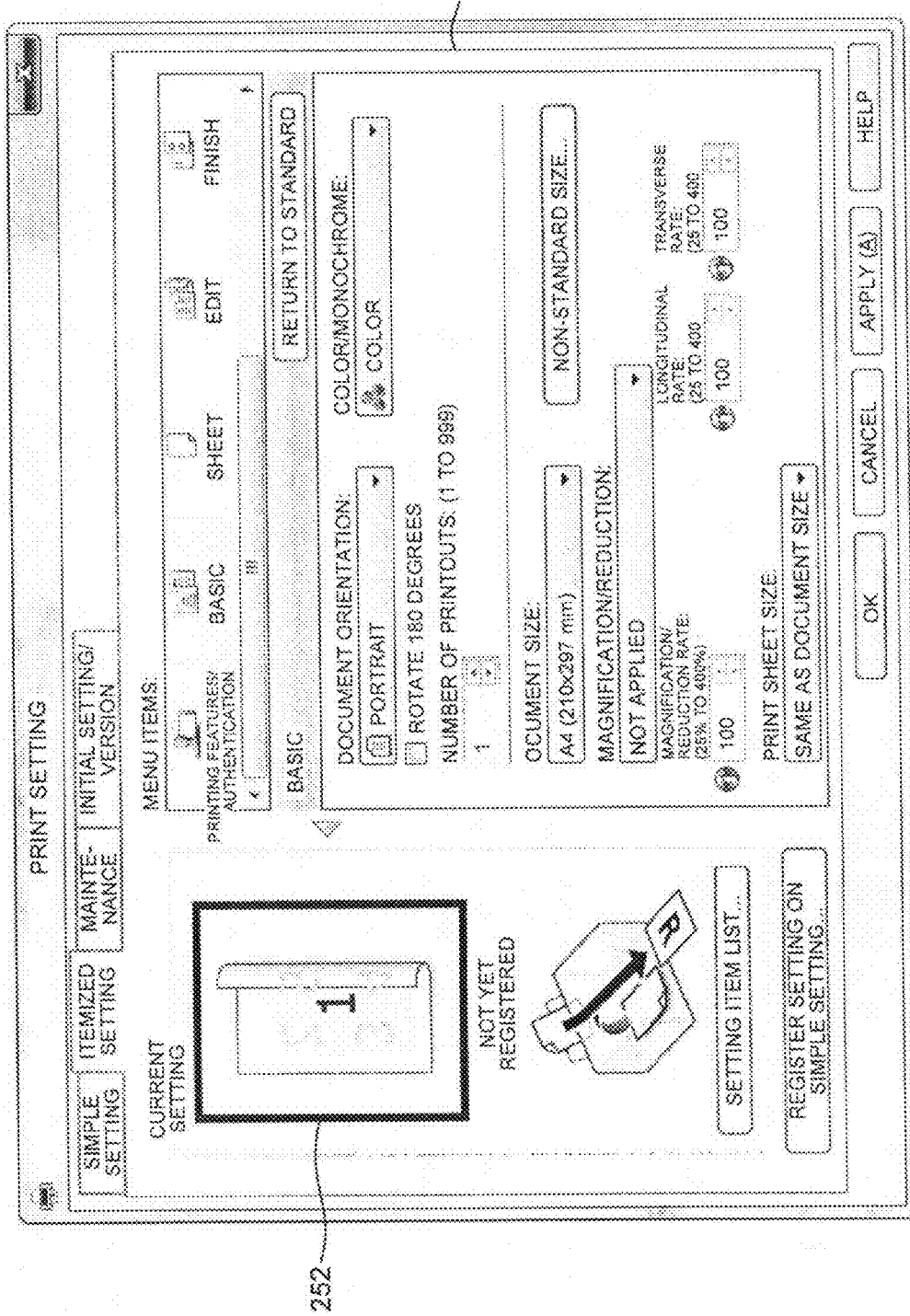

LEAFLET FOLD
FRONT 1 IN 1 BACK 4 IN 1 PORTRAIT

LEAFLET FOLD
FRONT 1 IN 1 BACK 4 IN 1 LANDSCAPE

LEAFLET FOLD
FRONT 4 IN 1 BACK 4 IN 1 PORTRAIT

LEAFLET FOLD
FRONT 4 IN 1 BACK 4 IN 1 LANDSCAPE

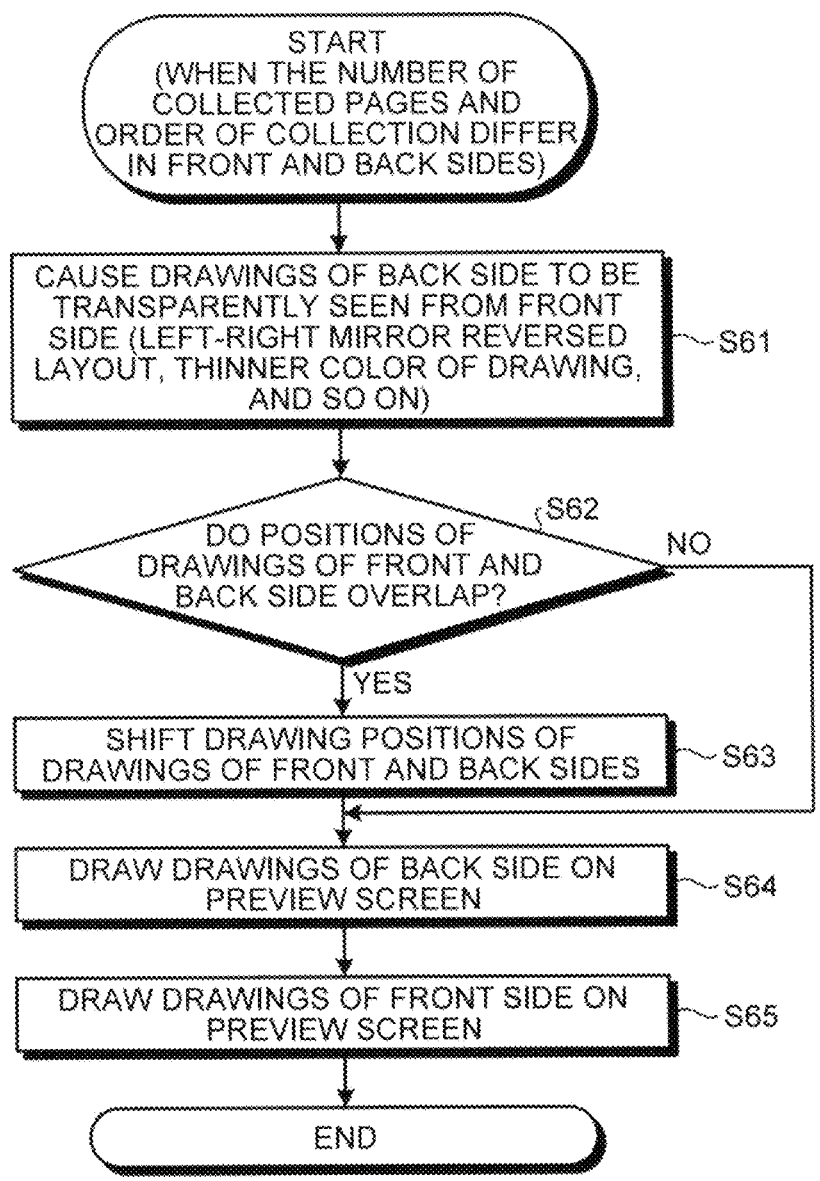

COMPUTER-READABLE RECORDING MEDIUM, INFORMATION PROCESSING APPARATUS, AND PRINTING SYSTEM

CROSS-REFERENCE TO RELATED APPLICATIONS

The present application claims priority to and incorporates by reference the entire contents of Japanese Patent Application No. 2012-063524 filed in Japan on Mar. 21, 2012 and Japanese Patent Application No. 2012-219889 filed in Japan on Oct. 1, 2012.

BACKGROUND OF THE INVENTION

1. Field of the Invention

The present invention relates to a non-transitory computer-readable recording medium that contains a print control program that causes a computer to function as a print control unit causing a printing apparatus capable of performing duplex printing to perform printing, an information processing apparatus that includes a print control unit causing a printing apparatus capable of performing duplex printing to perform printing, and a printing system that includes the printing apparatus and the information processing apparatus.

2. Description of the Related Art

Collective printing functions have been known that increase printable information on one sheet by laying out a plurality of pages on one side of the sheet when printing a document. Booklet printing functions also have been known that lay out a plurality of pages on one side of a sheet so as to enable the sheet after being printed to be formed into a brochure style by being folded, bound, and cut, for example. For example, Japanese Patent Application Laid-open No. 2009-64266 discloses a technique enabling a booklet to be readily made, in which a document is printed by collective printing with changing page order, sheets after being printed are cut into pieces, and the pieces are collated and bound as a booklet.

Such conventional collective printing, however, has a problem of a low degree of freedom in usage because the pages of the document are laid out on all pages of the sheets in a similar manner. The booklet printing, in which it is assumed that the sheets after being printed are subjected to cutting and binding for making a booklet, has a problem of taking much trouble to make a booklet.

In view of the circumstances, the present invention aims to enhance convenience of laying out pages in the duplex printing.

SUMMARY OF THE INVENTION

It is an object of the present invention to at least partially solve the problems in the conventional technology.

According to the present invention, there is provided a non-transitory computer-readable recording medium that contains a print control program that causes a computer to achieve a function for producing print data for causing a printing apparatus capable of performing duplex printing to perform printing, the program causing the computer to function as: a document data receiving unit configured to receive document data of a plurality of pages to be printed; a setting information receiving unit configured to receive special duplex printing in which a page layout manner differs on a first side and a second side in setting information used for performing printing; and a print data generating unit configured to produce print data in which the pages are laid out on the first side in a first layout manner and on the second side in a second layout manner different from the first layout manner as the print data for causing the printing apparatus to print the document data received by the document data receiving unit, when the special duplex printing is set in the setting information received by the setting information receiving unit.

The present invention also provides an information processing apparatus that produces print data for causing a printing apparatus capable of performing duplex printing to perform printing, the information processing apparatus comprising: a document data receiving unit configured to receive document data of a plurality of pages to be printed; a setting information receiving unit configured to receive special duplex printing in which a page layout manner differs on a first side and a second side in setting information used for performing printing; and a print data generating unit configured to produce print data in which the pages are laid out on the first side in a first layout manner and on the second side in a second layout manner different from the first layout manner as the print data for causing the printing apparatus to print the document data received by the document data receiving unit, when the special duplex printing is set in the setting information received by the setting information receiving unit.

The present invention also provides a printing system comprising a printing apparatus and an information processing apparatus that produces print data for causing the printing apparatus capable of performing duplex printing to perform printing, wherein the information processing apparatus comprises: a document data receiving unit configured to receive document data of a plurality of pages to be printed; a setting information receiving unit configured to receive special duplex printing in which a page layout manner differs on a first side and a second side in setting information used for performing printing; and a print data generating unit configured to produce print data in which the pages are laid out on the first side in a first layout manner and on the second side in a second layout manner different from the first layout manner as the print data for causing the printing apparatus to print the document data received by the document data receiving unit, when the special duplex printing is set in the setting information received by the setting information receiving unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a flowchart of print data generation processing performed by a drawing unit when a "head" is set as a back side layout page and a fixed value is set to the number of pages to be laid out;

FIG. 12 is a flowchart of the print data generation processing performed by the drawing unit when a "selected page" is set as the back side layout page and a fixed value is set to the number of pages to be laid out;

FIG. 15 is a schematic diagram illustrating an example of a setting screen including a second display example of the preview of the sheet to be folded into a leaflet;

FIG. 17 is a flowchart illustrating an example of processing performed by a UI unit for displaying a preview when the page layout differs in the front and back sides of a sheet.

DETAILED DESCRIPTION OF THE
PREFERRED EMBODIMENTS

Figure 1:
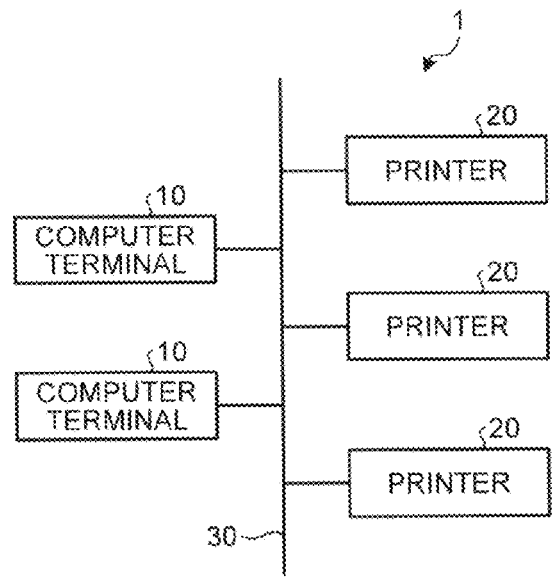
FIG. 1 is a block diagram illustrating a structure of a printing system including a computer terminal serving as an embodiment of an information processing apparatus of the invention and a printer serving as a printing apparatus that is caused by the computer terminal to perform printing.

Embodiments of the invention are described in detail below with reference to the accompanying drawings. FIG. 1 is a block diagram illustrating a structure of a printing system including a computer terminal serving as an embodiment of an information processing apparatus of the invention and a printer serving as a printing apparatus that is caused by the computer terminal to perform printing.

In this printing system 1 illustrated in FIG. 1, the computer terminals 10 serving as the embodiment of the information processing apparatus of the invention and the printers 20 that receive print data transmitted from the computer terminals 10 and print and output documents in accordance with the print data, are connected through a network 30. In the system, the printer 20 can perform duplex printing by which images are formed on both sides of a sheet such as paper.

Any communication path, such as a local area network (LAN), can be employed as the network 30 regardless of wired or wireless communication path. It is needless to say that the numbers of computer terminals 10 and printers 20 that are connected to the network 30 are not limited to those illustrated in FIG. 1. Although not illustrated in FIG. 1, the printing system 1 may be structured so that the computer terminals 10 and the printers 20 can directly connect with each other without interposing the network 30 therebetween.

Figure 2:
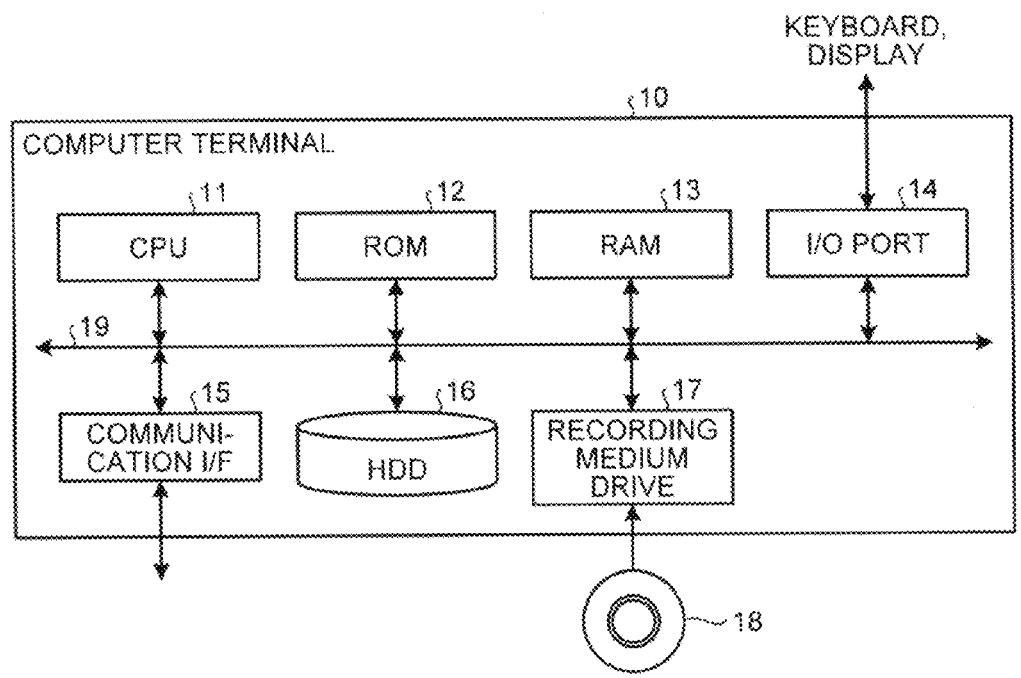
FIG. 2 is a schematic diagram illustrating an exemplary hardware structure of the computer terminal illustrated in FIG. 1.

FIG. 2 illustrates an exemplary hardware structure of the computer terminal 10 illustrated in FIG. 1. The hardware of the computer terminal 10 can be structured using a known personal computer (PC). As illustrated in FIG. 2, the computer terminal 10 includes a central processing unit (CPU) 11, a read only memory (ROM) 12, a random access memory (RAM) 13, an input-output port (I/O port) 14, a communication interface (I/F) 15, a hard disk drive (HDD) 16, a recording medium drive 17, all connected by a system bus 19.

The CPU 11 is a control unit that overall controls the whole of the computer terminal 10. The CPU 11 can execute various types of processing, which are describe later, and achieve various functions by reading programs stored in the ROM 12 or the HDD 16 and executing the read programs. The ROM 12 is a non-volatile storage unit that stores the programs executed by the CPU 11. The RAM 13 is a storage unit to which the CPU 11 loads the programs executed by the CPU 11, and is used by the CPU 11 as a working area when the CPU 11 executes various types processing.

The I/O port 14 is an interface that connects the computer terminal 10 to an operation receiving unit such as a keyboard or a mouse and a display unit such as a display. The communication I/F 15 is an interface by which the computer terminal 10 communicates with the other computer terminals and printers through the network or a universal serial bus (USB) cable. The communication I/F 15 is appropriately prepared in accordance with the standard of the network and a communication protocol to be used, for example. A plurality of communication I/Fs 15 can also be provided so as to correspond to a plurality of standards. The HDD 16 is a high capacity storage unit that stores therein the programs executed by the CPU 11 and various types of data processed by the CPU 11.

The recording medium drive 17 is a recording-reproduction unit that performs recording or reproduction on the recording medium 18, and is provided with an appropriate drive in accordance with the type of the recording medium 18 to be used. The recording medium 18 is a computer readable recording medium. Examples of the recording medium 18 include optical disks such as a compact disk (CD) and a digital versatile disk (DVD), magnetic optical disks such as a magneto-optic disk, and flexible disks such as a floppy disk (FD). Setting of the recording medium 18 recording the programs for achieving various functions such as functions of producing and transmitting print jobs, which are described later, to the recording medium drive 17 causes the computer terminal 10 to read the programs, and to install them into the HDD 16 or to cause the CPU 11 to execute them.

Once a power supply is turned on, the CPU 11 can read various programs including an operating system (OS), application programs, and user interfaces in the HDD 16 in accordance with a boot loader (boot program) in the ROM 12, loads them to the RAM 13, and thereafter operate in accordance with the various programs (selectively executes the various programs on a necessity basis) and achieve various functions relating to the invention by controlling the components including the ROM 12, the I/O port 14, the communication I/F 15, and the HDD 16. The various functions include the functions of the print control unit, a document data receiving unit, a setting information receiving unit, and a print data generating unit.

A software structure of the computer terminal 10 and a procedure of performing printing are specifically described below with reference to FIG. 3. The processing and control of software such as an application and a printer driver, which are described later, are achieved by the CPU executing the software. However, for expository convenience, the following description is made on the assumption that each piece of the software executes the corresponding processing.

Figure 3:
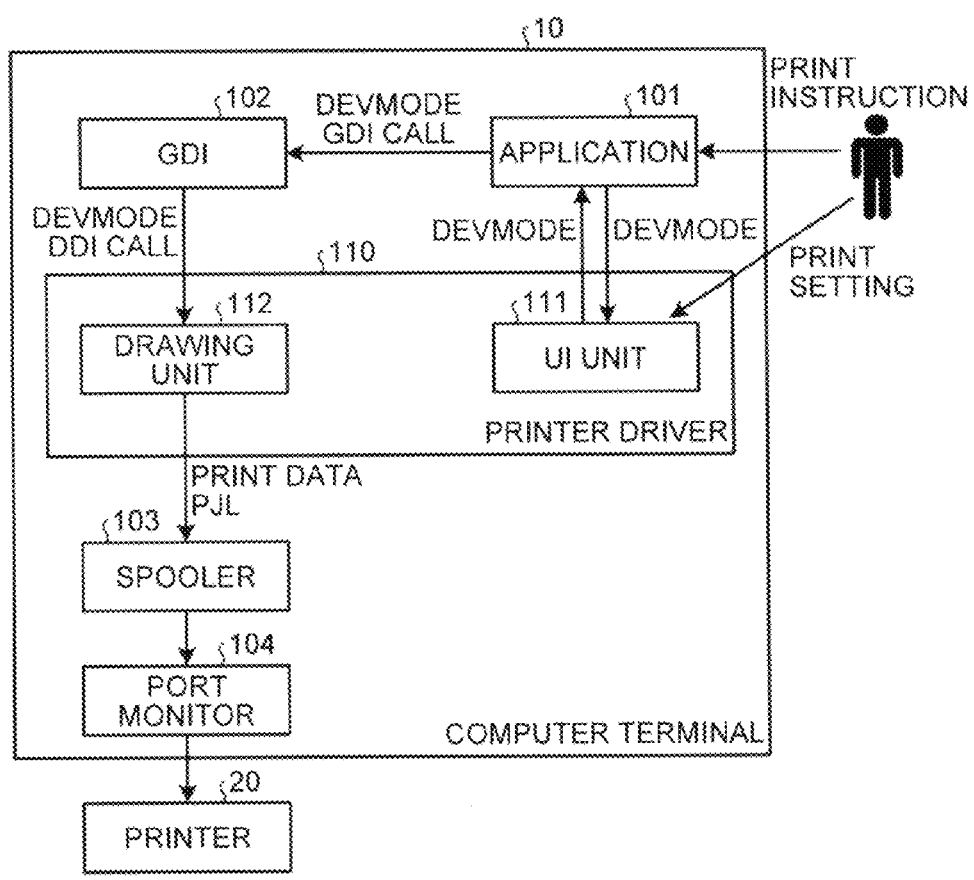
FIG. 3 is a block diagram illustrating an exemplary software structure of the computer terminal illustrated in FIG. 1.

FIG. 3 is a block diagram illustrating an exemplary software structure of the computer terminal 10 illustrated in FIG. 1. In FIG. 3, the OS is omitted. In the computer terminal 10, the OS, e.g., Windows (trademark) available from Microsoft Corporation, operates, and an application 101, a printer driver 110, a graphic device interface (GDI) 102 as a component of the OS, a spooler 103, and a port monitor 104 operate as modules performing operation relating to the feature of the embodiment.

The application 101 is a program for editing and managing documents to be printed. Users can create documents and make print instructions using the application 101. The GDI 102, which is a rendering engine provided by Windows (trademark) OS, provides services on overall image drawing. The use of the GDI 102 in output processing of applications enables appearances and operational feelings of the applications to be standardized to those provided by Windows (trademark) because the GDI 102 absorbs the differences due to models and apparatuses.

When printing of a document is instructed, the application 101 converts document data of the document to be printed into a graphic device interface (GDI) call that is a format the GDI 102 can understand, and passes to the DGI 102 the GDI call and a DEVMODE structure (hereinafter, simply referred to as the "DEVMODE"), which is setting information used for printing, attached to the GDI call. The GDI 102 converts the received GDI call into a device driver interface (DDI) call corresponding to the capability of the printer driver 110 corresponding to the printer used for printing, and passes the DDI call to a drawing unit 112 of the printer driver 110 together with the DEVMODE received from the application 101.

The printer driver 110 is a module for controlling the printer and the print control unit prepared in accordance with the model of the printer 20. The printer driver 110 includes a user interface (UI) unit 111 and the drawing unit 112. The UI unit 111 provides a graphical user interface (GUI) for receiving settings that are unique to the printer to be controlled and cannot be received by the application 101. The settings include settings relating to special duplex printing, which is described later.

The application 101, which retains the setting information used for printing as the DEVMODE, passes the retained DEVMODE to the UI unit 111 when a user instructs a change of the setting. Upon receiving the DEVMODE, the UI unit 111 causes a display to display a GUI for receiving settings used for printing with the passed values of the DEVMODE as initial values and receives the setting operation of a user. Once the user fixes the setting change, the UI unit 111 changes the values of the DEVMODE in accordance with the setting change and returns the changed DEVMODE to the application 101. The application 101 retains the changed DEVMODE as the setting information used for the succeeding printing.

The drawing unit 112 draws bitmap data of an image to be formed in a page memory on the basis of the document data that is output from the application 101 and represents a content of an image to be printed. The drawing unit 112 converts the bitmap data into the print data (print data in a print language format) described in a printer language format processable by the printer to be controlled. The drawing unit 112 can add the setting information to the print data using a printer job language (PJL) if necessary.

As described above, the document data edited by the application 101 is converted into the DDI call when the document data is passed to the drawing unit 112 for printing. It can be said that the DDI call is the document data representing the content of the document to be printed. The drawing unit 112 performs the drawing on the basis of the DDI call and the DEVMODE passed together with the DDI call, and produces the print data for causing the printer 20 to perform printing according to the settings indicated by the DEVMODE. The drawing unit 112 functions as the document data receiving unit when receiving the DDI call, and functions as the setting information receiving unit when receiving the DEVMODE. The drawing unit 112 functions as the print data generating unit when producing the print data.

The settings indicated by the DEVMODE include those to be reflected in the drawing and those to be reflected in image forming performed by the printer 20. For example, in the drawing, when collective printing is set, the drawing unit 112 produces the bitmap data of one page in which a plurality of pages of a document are individually reduced in size and laid out at appropriate positions on the basis of the DDI calls of the pages of the document. In the laying out of the pages, the respective images of the pages can be laid out by individually being oriented for each page of the document. The drawing unit 112 causes the printer 20 to form the images on one side of a sheet on the basis of the bitmap data of one page. As a result, printing can be performed by which the pages of the document are collected on one side of the sheet.

When the duplex printing is set, the drawing is performed in the same manner as one-sided printing. However, it is possible to cause the printer 20 to form different images from each other on both sides of a sheet on the basis of the bitmap data of two pages by transmitting data indicating that the duplex printing is required to be performed when the bit map data is transmitted to the printer 20. The collective printing and the duplex printing can of course be combined. The print data includes the data indicating the content of an image to be printed and the setting information indicating the necessary settings such as the duplex printing.

In the example of the embodiment, the drawing unit 112 produces the bitmap data. When the printer 20 to be controlled has the drawing function, the print data can be produced on the basis of data before being used for the drawing. In such a case, the bitmap data is produced by the printer 20 having received the print data. The setting information indicating the collective printing is also transmitted to the printer 20 so as to reflect the setting into the drawing performed by the printer 20.

The spooler 103, which is a module provided by the OS, has a function to temporarily store therein the print data to be transmitted to the printer 20. The port monitor 104 is also a module provided by the OS. When the print data to be transmitted to the printer 20 is stored in the spooler 103, the port monitor 104 transmits the print data to the printer 20 by which jobs relating to the print data are performed.

Figure 4:
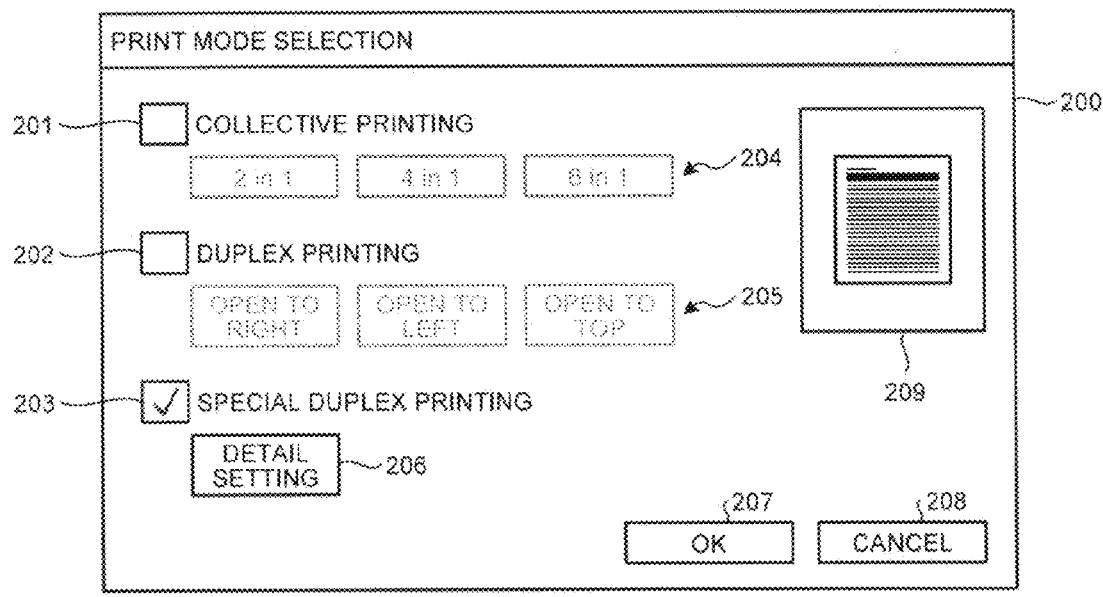
FIG. 4 is a schematic diagram illustrating a display example of a mode selection screen.
Figure 5:
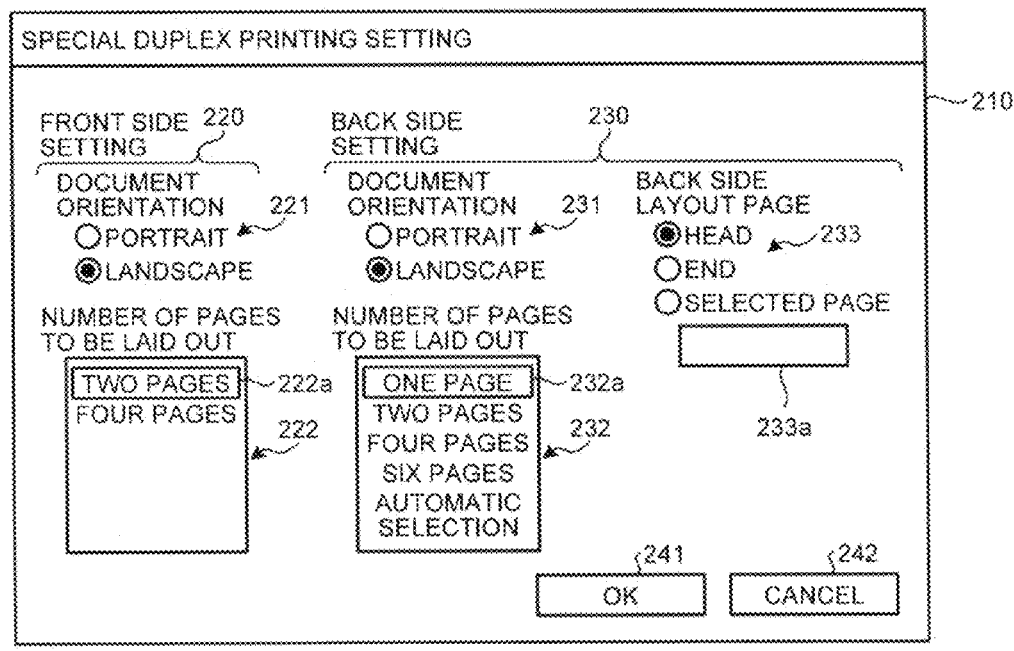
FIG. 5 is a schematic diagram illustrating a display example of a detail setting screen.

A feature of the computer terminal 10 having the software structure described above is a function relating to special duplex printing in which a page layout manner differs on a first side and a second side of a sheet. The feature is described below. FIGS. 4 and 5 illustrate examples of the GUI displayed by the function of the UI unit 111. FIG. 4 illustrates a mode selection screen 200 for receiving a selection of print modes such as the collective printing and the duplex printing.

The mode selection screen 200 is provided with a collective printing selection unit 201, a duplex printing selection unit 202, a special duplex printing selection unit 203, a collection page count designation unit 204, a duplex printing format designation unit 205, a detail setting button 206, an OK button 207, a cancel button 208, and a print preview 209. The collective printing selection unit 201 and the duplex printing selection unit 202 are checkboxes for selecting conventional collective printing and duplex printing, respectively. When a user checks these checkboxes, the UI unit 111 causes the collection page count designation unit 204 and the duplex printing format designation unit 205 to be active in accordance with the checked checkboxes. Users can designate the number of pages to be collected and the format of duplex printing using those buttons. The collective printing and the duplex printing can be selected simultaneously.

The special duplex printing selection unit 203 is a checkbox for selecting special duplex printing. When a user checks the checkbox, the UI unit 111 causes the detail setting button 206 to be active. When the user presses the detail setting button 206, the UI unit 111 causes a detail setting screen 210 for receiving detailed settings relating to the special duplex printing to be displayed as a pop-up as illustrated in FIG. 5. In the special duplex printing, the collective printing and the duplex printing cannot be selected simultaneously. When the special duplex printing is selected, the UI unit 111 automatically cancels the settings of the collective printing and the duplex printing.

The OK button 207 is used for fixing the settings made in the mode selection screen 200 and the detail setting screen 210 and returning to the original screen. The cancel button 208 is used for returning to the original screen without changing the settings. The UI unit 111 causes the print preview 209 to display an image indicating the current print mode set in the mode selection screen 200. In the image displayed in the print preview 209, the settings made in the mode selection screen 200 are reflected. As a result, the user can intuitively know the current print mode from the image displayed in the print preview 209.

FIG. 5 illustrates the detail setting screen 210. The detail setting screen 210 is provided with a front side setting unit 220, a back side setting unit 230, an OK button 241, and a cancel button 242. The front side setting unit 220 receives the settings relating to printing on a first side in the duplex printing. Images of a plurality of pages of the document data are laid out on the first side in a first layout manner in which the images are individually oriented such that only the first side is formed into a brochure style when the sheet is folded after being printed. The front side setting unit 220 is provided with a document orientation setting unit 221 and a layout page count setting unit 222.

The document orientation setting unit 221 has radio buttons used for setting whether the page of a document is to be printed in portrait or landscape. The layout page count setting unit 222 is used for setting the number of pages of a document to be laid out (arranged) on the front side of a sheet. The number of pages currently set is indicated by a cursor 222a. In the example of FIG. 5, two pages and four pages are prepared as the options and the option of the two pages is selected.

The back side setting unit 230 receives the settings relating to printing on a second side in the duplex printing. Images of one or more pages of the document data are laid out on the second side in a second layout manner in which the images are laid out such that all of the pages are arranged in the same orientation, which differs from the first layout manner. The back side setting unit 230 is provided with a document orientation setting unit 231, a layout page count setting unit 232, and a back side layout page setting unit 233. The document orientation setting unit 231 has the radio buttons used for setting whether the page of a document is to be printed in portrait or landscape.

The layout page count setting unit 232 is used for setting the number of pages of a document to be laid out (arranged) on the back side of the sheet. The number of pages currently set is indicated by a cursor 232a. In the example of FIG. 5, one page, two pages, four pages, six pages and automatic selection are prepared as the options and the option of one page is selected. The "automatic selection" is a setting for automatically selecting the number of pages to be laid out on the back side in accordance with the number of pages included in a document to be printed and the number of pages to be laid out on the front side. The other settings set the number of pages to be laid out on the back side to the fixed values. The setting of the number of pages to be laid out on the back side performed by the layout page count setting unit 232 can be done independently from the setting of the number of pages to be laid out on the front side performed by the layout page count setting unit 222.

The back side layout page setting unit 233 is used for setting which page of a document to be printed is laid out on the back page. In the example of FIG. 5, a head, an end, and a selected page are prepared as the options. When the option of the selected page is selected, the UI unit 111 causes a page number input column 233a to be active and receives a designation of a page number. The option of the "head" is the setting for laying out pages from the head of the document as many as the number of pages to be laid out on the back side. The option of the "end" is the setting for laying out pages from the end of the document as many as the number of pages to be laid out on the back side. The option of the "selected page" is the setting for laying out the page having the number input in the page number input column 233a on the back side. When the number of numerals input in the page number input column 233a is not equal to the number of pages to be laid out, remaining layout destinations may be filled with blanks and pages having no layout destinations may be laid out on the next sheet.

The OK button 241 is used for fixing the settings made in the detail setting screen 210 and returning to the mode selection screen 200. The cancel button 242 is used for returning to the mode selection screen 200 without changing the settings.

In the embodiment, the front side is the first side while the back side is the second side. However, the opposite may be applicable. The special duplex printing is a print mode for printing a document on basically one sheet. It is not necessary to be aware of which side of the sheet is the front side or the back side after being printed. In the printer, sheets are discharged face up or face down. In such cases, it is not necessary to be particularly aware of whether the first side or the second side is discharged face up because it is generally easy to grasp which side is the first side when the sheet is checked after being printed, as described later. Likewise, it is not necessary to be particularly aware of whether an image of the first side or the second side is formed first on a sheet.

The processing performed by the drawing unit 112 when performing the special duplex printing and the print results of the special duplex printing are described below. The processing described below is the processing corresponding to the function of the drawing unit 112 performed as a result of the CPU 11 executing a predetermined program. However, the following description is made on the assumption that the drawing unit 112 performs each processing. In the flowchart described below, only processing relating to the production of the print data is illustrated. The outputting of the print data to the spooler and adding of the setting information using the PJL are separately performed by other processing (not illustrated).

FIG. 6 illustrates a flowchart when the "head" is set as the back side layout page and a fixed value is set to the number of pages to be laid out. When receiving the DDI call, which is the document data indicating the content of the document to be printed, and the DEVMODE indicating the settings used for printing from the GDI 102, the drawing unit 112 analyzes the content of the DEVMODE. If the drawing unit 112 determines that the special duplex printing is designated, the "head" is set as the back side layout page, and a fixed value is set to the number of pages to be laid out, the drawing unit 112 starts the processing illustrated in the flowchart of FIG. 6.

First, in the processing, the drawing unit 112 produces the print data of one page in which, out of the unprocessed pages of the received document data, the pages are laid out as many as the designated number of pages to be laid out on the back side from the head of the pages (step S11). When the number of pages is four, the drawing unit 112 produces the print data of one side of a sheet in which images of the four pages are laid out. In this layout, all of the pages are laid out in the same orientation so as to be suitable for browsing the sheet after being printed in an unfolded (in a spread) state. The produced print data is used for performing printing on the second side.

The layout described herein can be achieved, when the drawing unit 112 performs the drawing processing, by drawing an image of one page of the document data in the bitmap data for printing of one page at a predetermined position, orientation, and magnification/reduction rate. When the print data in which images of four pages of the document data are laid out is produced, the processing is repeated four times. The layout positions of the images of the respective pages can be determined with drawing start coordinates in the bitmap, for example. The orientation can be determined in such a manner that the pages are rotated by X degrees. The magnification/reduction rate can be determined in such a manner that the longitudinal reduction rate is 50% while the transverse reduction ratio is 50%, for example.

When the printer 20 performs the drawing processing, the layout can be achieved by adding the following data to the print data to be transmitted to the printer: data indicating what range of the pages of the document data is to be laid out on one side of a sheet, and data indicating the respective positions, orientations, and magnification/reduction rates of the images of the respective pages for being laid out on the sheet.

Then, the drawing unit 112 produces the print data of one page in which, out of the unprocessed pages of the document data, the succeeding pages of the pages laid out at step S11 are laid out as many as the designated number of pages to be laid out on the front side (step S12). In this layout, the images of the respective pages are rotated such that the sheet is formed into a brochure style when the sheet is folded after being printed. When the number of unprocessed pages of the document data is smaller than the number of pages to be laid out on the front side, blank data corresponding to the lacking pages is laid out on the front side. The produced print data is used for performing printing on the first side. The drawing unit 112 determines whether the unprocessed pages, which are not yet laid out, remain in the document data (step S13) and if the unprocessed pages remain, returns to step S11, at which the drawing unit 112 repeats the processing. If no unprocessed pages remain, the drawing unit 112 ends the processing.

The drawing unit 112 passes the print data produced by the processing described above to the spooler 103 together with the setting information indicating the duplex printing. The spooler 103 spools the print data and the setting information. The port monitor 104 transmits the print data and the setting information to the printer 20. The print data is transmitted through the spooler 103 and the port monitor 104 in the order in which the data is produced by the drawing unit 112. Accordingly, in the processing of FIG. 6, the data for the second side produced at step S11 is transmitted to the printer 20 prior to the data for the first side produced at step S12. The printer 20 also forms the image for the second side on a sheet first and thereafter forms the image for the first side on the back side of the sheet.

The special duplex printing is the print mode based on the assumption that one document is printed on one sheet. The typography is not influenced by the printing order of the sides of the sheet. Because of such assumption, the processing to perform printing on the second sheet onward if the determination is YES at step S13 is regarded as error handling when the number of pages of the document exceeds the supposed number.

The document data supplied to the drawing unit 112 from the application 101 through the GDI 102 is the data of the document on which a user has made printing instructions in the application 101. Hence, the drawing unit 112 cannot control the number of pages of the document data. Basically, a user should manage the number of pages of the document to be printed on the basis of the settings done in the UI unit 111. However, sometimes, the management is not properly done due to misunderstanding or mistakes in operation. To enable printing to be ordinarily performed in such a case, step S13 is provided in the processing of FIG. 6.

Figure 7A:
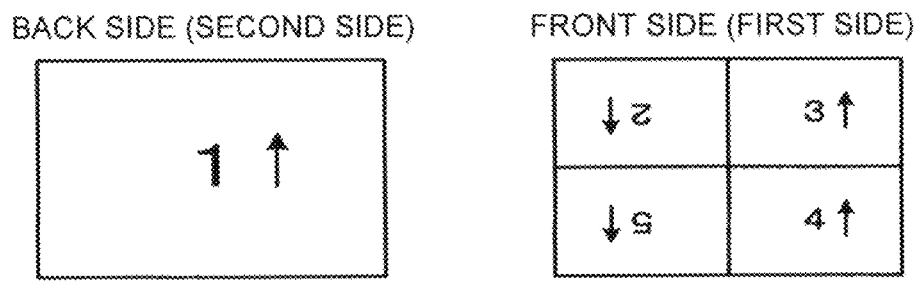
FIGS. 7A and 7B are schematic diagrams illustrating examples of a printout printed on the basis of the print data produced by the processing of FIG. 6.
Figure 7B:
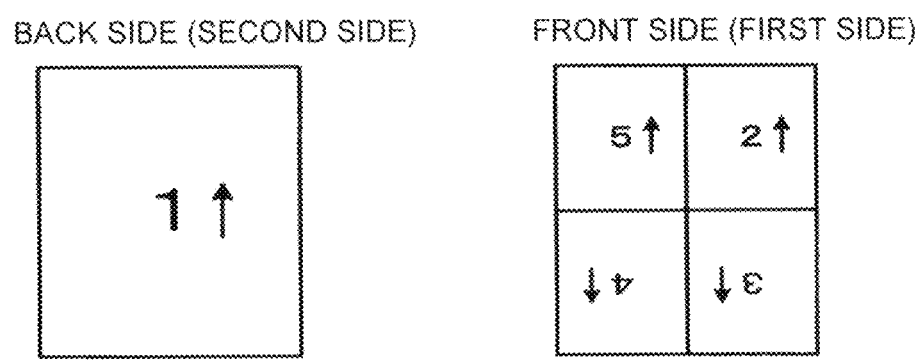
Figure 8A:
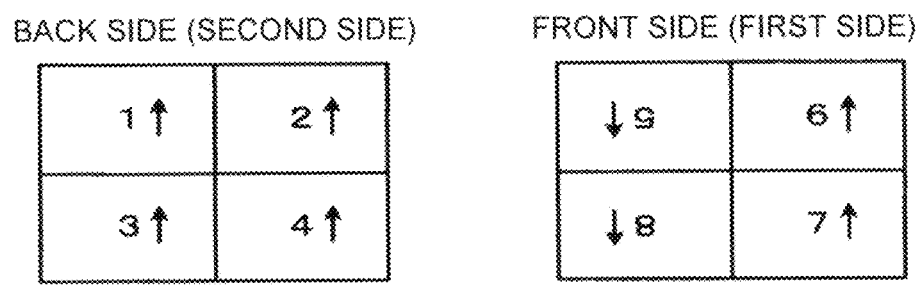
FIGS. 8A and 8B are schematic diagrams illustrating other examples of the printout.
Figure 8B:
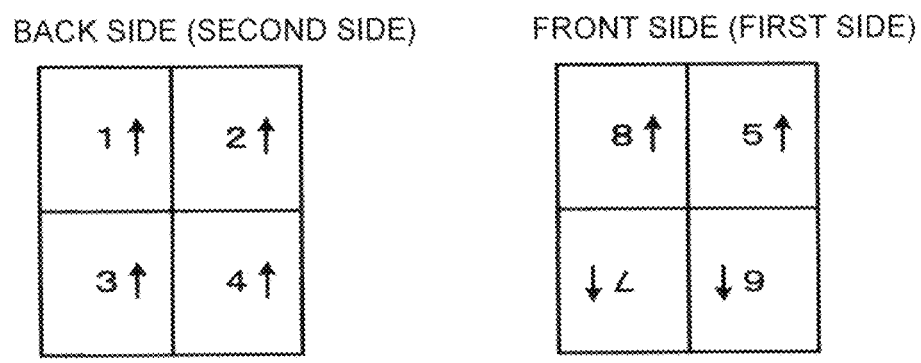

FIGS. 7A, 7B, 8A, and 8B illustrate examples of the printouts printed on the basis of the print data produced by the processing thus described. FIGS. 7A and 7B illustrate an example when the number of pages to be laid out on the front side is one while the number of pages to be laid out on the back side is four. FIGS. 8A and 8B illustrate an example when the number of pages to be laid out on the back side is four while the number of pages to be laid out on the front side is four. FIGS. 7A and 8A illustrate examples when the page of a document is in landscape while FIGS. 8B and 8B illustrate examples when the page of a document is in portrait. The numbers in the figures indicate the respective page numbers of the document in the application 101 while the arrows indicate the upward directions of the images in the respective pages.

As illustrated in FIGS. 7A, 7B, 8A, and 8B, the prints are made in large size or the pages are printed in the same orientation on the second sides of the printouts, which are suitable for seeing the printouts by spreading the sheets.

The respective print directions of the pages laid out on the first sides are not the same in a state in which the sheets are spread. As a result, it is difficult to see the pages in the same direction. The sheets, however, can be formed into a brochure style by being folded. In each example of FIGS. 7A and 8A, in which the sheets are in landscape, an open-to-top brochure of four pages can be formed that allows browsing of four pages formed on the first side in the same direction, by folding the right side of the sheet at the central vertical line toward the far side, and thereafter folding the upper side of the sheet at the central horizontal line toward the far side. In each example of FIGS. 7B and 8B, in which the sheets are in portrait, an open-to-left brochure of four pages can be formed that allows browsing of four pages formed on the first side in the same direction, by folding the lower side of the sheet at the central horizontal line toward the far side, and thereafter folding the left side of the sheet at the central vertical line toward the far side. The pages in landscape can be laid out so as to be able to form an open-to-left/right brochure or the pages in portrait can be laid out so as to be able to form an open-to-top/bottom brochure by changing the layout positions and the orientations of the respective pages. When the orientations of the document on the front side and the back side are set to different orientations in the detail setting screen 210 illustrated in FIG. 5, the page of the second side can be laid out as in the example of FIG. 7A or 8A, while the page of the first side can be laid out as in the example of FIG. 7B or 8B. Of course, the page of the second side can be laid out as in the example of FIG. 7B or 8B, while the page of the first side can be laid out as in the example of FIG. 7A or 8A.

In any of the cases, information that needs to be frequently referred to may be printed on the first side, while information used for browsing may be printed on the second side. This layout makes it possible to readily make a highly convenient brochure, which naturally allows users to refer to necessary information in the brochure formed in a compact, folded shape, and to refer to additional information by unfolding and turning over the sheet when necessary. Such a brochure can be used when an information map of a facility is made, for example. In the brochure, explanations of respective areas are printed on the first side whereas the whole map is printed on the second side, for example. As another usage, an overall explanation of an apparatus is printed on the first side whereas the detailed explanation is printed on the second side. As still another usage, a function list is printed on the first side whereas diagrams of setting screens for the functions in the list are printed on the second side. In this case, it is preferable that a plurality of pages can be laid out on the second side because the explanations to be printed on the second side may cover a plurality of pages.

In the computer terminal 10, the drawing unit 112 included in the printer driver 110 has the function that lays out the contents of the respective pages of the document to the images to be printed in the forms illustrated in FIGS. 7A, 7B, 8A, and 8B, i.e., the function that performs the processing of FIG. 6. As a result, users can make a brochure without using an editing application that is expensive and requires complicated operation.

For example, a printout capable of forming a brochure can be obtained simply by making a document using a word processor, and making a few settings using the function of the UI unit 111 in printing. If a printer capable of performing the duplex printing is available, a brochure can be made without using an expensive apparatus such as a finisher, or tools such as scissors and a stapler. Such a function is particularly useful in an environment in which users who are relatively unfamiliar to computers need to make brochures with a low budget. The same effects as those described above can be obtained when printing is performed using other settings and processing described with reference to FIG. 9 onwards.

The processing by which a first page or a plurality of beginning pages are laid out on the second side, which is illustrated in FIG. 6, is useful for a case in which no blank page is required to be laid out on the second side. When processing the document data, usually, the drawing unit 112 sequentially receives the data of one page each and receives no data indicating the total numbers of pages. Accordingly, when the pages other than the head page are laid out on the second side, the production of the print data needs to start after the confirmation is made that data of pages as many as the number of pages need to be laid out on the second side is to be transmitted. In this case, to prevent blanks from being made on the second side, the number of pages to be laid out on the first side cannot be determined until the data of pages to be laid out on the second side is also received even if the print data of the first side is produced prior to that of the second side.

For example, when the number of pages to be laid out on the first side is four and the number of pages to be laid out on the second side is one, if data of five pages (or more than five pages) is transmitted, the images of four pages can be laid out on the first side whereas if data of four or less pages is transmitted, no page is laid out on the second side unless the number of pages to be laid out on the first side is reduced. Hence, it must be confirmed that data of five pages (or more than five pages) is transmitted for starting to produce the print data of the first and the second sides. When the number of the pages to be laid out on the second side is designated, the production of the print data of the second side can start at the time when receiving of the page is complete. Even in such a case, the production of the print data cannot start until the page is received.

In contrast, when a first page or a plurality of beginning pages are laid out on the second side, the production of the print data of the second side can start at the time when the data of the first page is received. Because, in this case, the pages to be laid out on the second side are first laid out, and thereafter remaining pages can be laid out on the first side. As a result, the drawing unit 112 can start to produce the print data promptly after receiving of the document data, thereby enabling the time for printing to be reduced.

Particularly, when only one page is laid out on the second side as illustrated in FIGS. 7A and 7B and no page is laid out on the second side, the printout is practically a one-sided printout. As a result, the advantages of the special duplex printing are not used. Hence, the necessity of preventing blanks from being formed on the second side is high. The processing that lays out a first page of a document on the second side is useful for a case where high speed printing is performed while satisfying such necessity.

Figure 9:
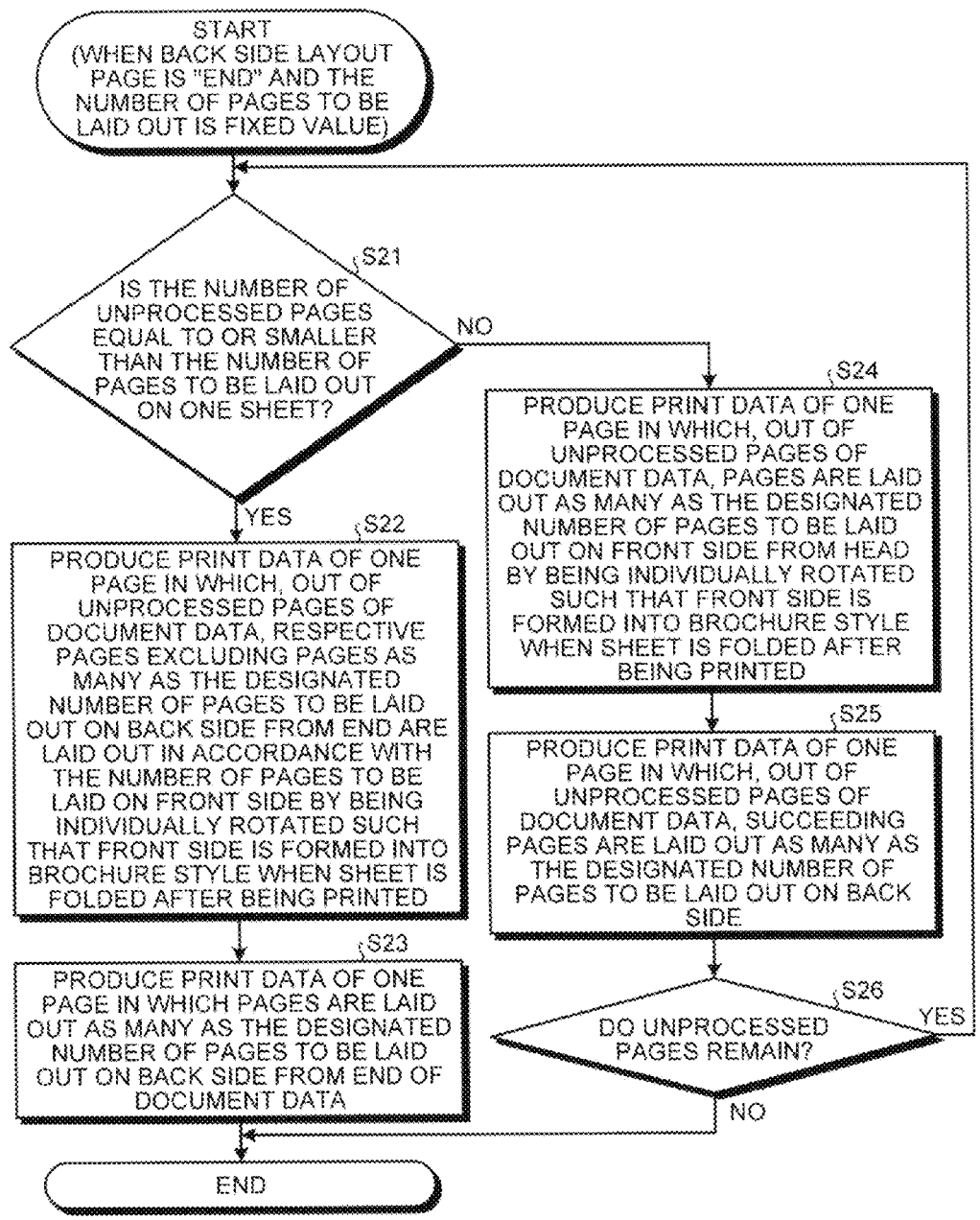
FIG. 9 is a flowchart of the print data generation processing performed by the drawing unit when an "end" is set as the back side layout page and a fixed value is set to the number of pages to be laid out.

FIG. 9 illustrates a flowchart when the "end" is set as the back side layout page and a fixed value is set to the number of pages to be laid out. The drawing unit 112 starts to perform the processing illustrated in the flowchart of FIG. 9 upon determining that the special duplex printing is designated, the "end" is set as the back side layout page, and a fixed value is set to the number of pages to be laid out as a result of analyzing the DEVMODE described with reference to FIG. 6.

In the processing, first, the drawing unit 112 determines whether the number of unprocessed pages of the received document data is equal to or smaller than the number of pages laid out on a sheet (sum of the numbers of pages to be laid out on the front and back sides) (step S21). This determination is performed after all document data is received or after the confirmation is made that succeeding pages still remain after the pages are received at least as many as the number of pages to be laid out on one sheet. Usually, the determination is supposed to be YES because the special duplex printing is the print mode for printing a document on basically one sheet as described above. The processing performed if the determination is NO is regarded as error handling when the number of pages of the document exceeds the supposed number.

If the determination is YES at step S21, the drawing unit 112 produces the print data of one page in which, out of the unprocessed pages of the received document data, the respective pages excluding the pages as many as the designated number of pages to be laid out on the back side from the end of the unprocessed pages are laid out in accordance with the number of pages to be laid out on the front side (step S22). For example, when the document data includes five pages and the number of pages to be laid out on the back side is two, pages excluding two pages from the end of the pages, i.e., page 1 to page 3, which excludes page 5 and page 4, are laid out. In this layout, the respective images of the pages are rotated such that the sheet is formed into a brochure style when the sheet is folded after being printed. When the number of pages to be laid out is smaller than the number of pages to be laid out on the front side, blank data corresponding to the lacking pages is laid out. The produced print data is used for performing printing on the first side.

Subsequently, the drawing unit 112 produces the print data of one page in which the pages are laid out as many as the designated number of pages to be laid out on the back side from the end of the received document data (step S23), and thereafter ends the processing. When the number of pages to be laid out is four, the drawing unit 112 produces the print data of one side of the sheet in which the images of the four pages are laid out. In this layout, all of the pages are laid out in the same orientation. The produced print data is used for performing printing on the second side.

If the determination is NO at step S21, the drawing unit 112 produces, as the print data used for performing printing on the first side, the print data of one page in which, out of the unprocessed pages of the received document data, the pages are laid out as many as the designated number of pages to be laid out on the front side from the head of the unprocessed pages (step S24). The layout orientation is the same as that at step S22.

Thereafter, the drawing unit 112 produces, as the print data used for performing printing on the second side, the print data of one page in which, out of the unprocessed pages of the received document data, the succeeding unprocessed pages are laid out as many as the designated number of pages to be laid out on the back side (step S25). The layout orientation is the same as that at step S23.

Thereafter, the drawing unit 112 determines whether unprocessed pages remain (step S26), and if unprocessed pages remain, returns to step S21, at which the drawing unit 112 repeats the processing. If no unprocessed pages remain, the drawing unit 112 ends the processing. The determination at step S26 is supposed to be NO if no error occurs. The print data produced by the processing described above is transmitted to the printer 20 in the same manner as that of FIG. 6.

Figure 10A:
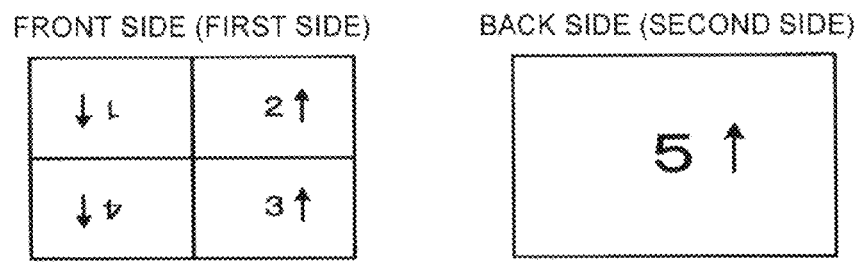
FIGS. 10A and 10B are schematic diagrams illustrating examples of a printout printed on the basis of the print data produced by the processing of FIG. 9.
Figure 10B:
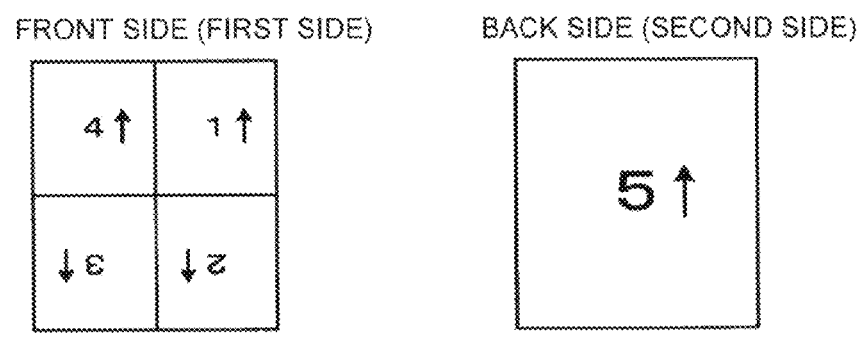
Figure 11A:
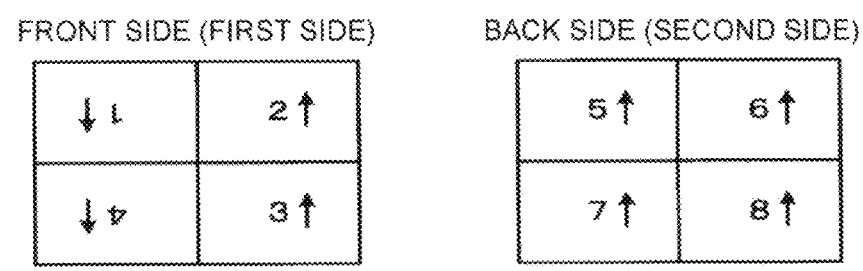
FIGS. 11A and 11B are schematic diagrams illustrating other examples of the printout.
Figure 11B:
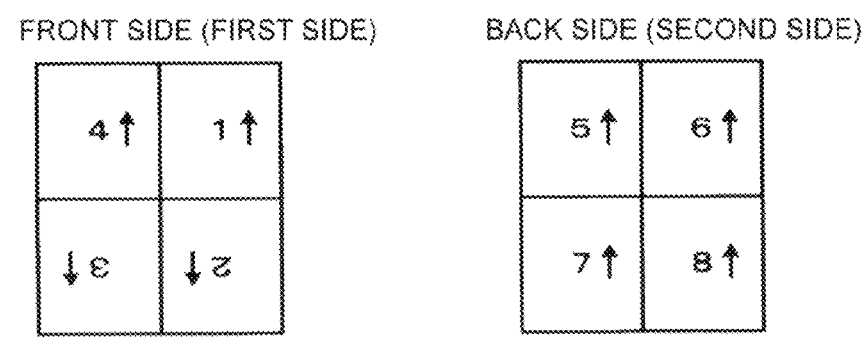

FIGS. 10A, 10B, 11A, and 11B illustrate examples of the printouts printed on the basis on the print data produced by the processing thus described. FIGS. 10A and 10B illustrate an example when the number of pages to be laid out on the back side is one while the number of pages to be laid out on the front side is four. FIGS. 11A and 11B illustrate an example when the number of pages to be laid out on the back side is four while the number of pages to be laid out on the front side is four. FIGS. 10A and 11A illustrate examples when the page of a document is in landscape while FIGS. 10B and 11B illustrate examples when the page of a document is in portrait. The numbers in the figures indicate the respective page numbers of the document in the application 101 while the arrows indicate the upward directions of the respective images in the pages.

As can be seen from the comparison with FIGS. 7A, 7B, 8A, and 8B, the printouts after the processing in FIG. 9 are the same as those after the processing in FIG. 6, except for that a last one page or a plurality of end pages are laid out on the second side. In the same manner as those described with reference to FIGS. 7A, 7B, 8A, and 8B, a printout can be obtained that forms a brochure in which the respective pages on the front side can be referred to in the same direction simply by folding the sheet and is preferable for browsing the back side of the sheet by spreading the sheet.

When the application 101 edits a document, a content to be laid out outside a brochure such as a title may be produced first or information that needs to be frequently referred to may be produced first. Otherwise, contents to be referred to when necessary such as reference materials may be attached last.

On the assumption that the editing is performed in such a procedure, by laying out the last page on the second side, users can perform desired special duplex printing without adjusting the sorting order of pages in the document edited in the application 101. As a result, even though the processing time is longer than that of the processing in FIG. 6, the whole operating time can be reduced and printing can be performed with a natural operational feeling.

In the processing of FIG. 9, unlike the processing of FIG. 6, the printer 20 first forms images of the first side on a sheet and thereafter forms the images of the second side on the back side of the sheet. In the drawing unit 112, it is preferable to produce the print data in the order of pages of the document data. Accordingly, the processing at step S22 is performed prior to the processing at step S23, while the processing at step S24 is performed prior to the processing at step S25. The order, however, is not limited to this. As aforementioned, a change in printing order causes no problem.

FIG. 12 illustrates a flowchart when the "selected page" is set as the back side layout page and a fixed value is set to the number of pages to be laid out. The drawing unit 112 starts to perform the processing illustrated in the flowchart of FIG. 12 upon determining that the special duplex printing is designated, the "selected page" is set as the back side layout page, and a fixed value is set to the number of pages to be laid out as a result of analyzing the DEVMODE described with reference to FIG. 6.

In the processing, first, the drawing unit 112 produces the print data of one page in which, out of the received data, designated one or a plurality of pages to be laid out on the back side are laid out in accordance with the number of pages to be laid out on the back side (step S31). When the number of pages to be laid out on the back side is not equal to the designated number of pages, blank data corresponding to the lacking pages is laid out. When excess pages remain, the excess pages are excluded from the targets to be laid out. In this layout, all of the pages are laid out in the same orientation. The produced print data is used for performing printing on the second side. The processing at step S31 starts after the document data is received until at least the pages designated to be laid out on the back side are received.

Then, the drawing unit 112 produces the print data of one page in which, out of the unprocessed pages of the received document data, which are remaining pages after the pages are laid out at step S31, the pages are laid out as many as the designated number of pages to be laid out on the front side from the head of the pages (step S32). In this layout, the respective images of the pages are rotated such that the sheet is formed into a brochure style when the sheet is folded after being printed. When the number of unprocessed pages of the document data is smaller than the number of pages to be laid out on the front side, blank data corresponding to the lacking pages is laid out. The produced print data is used for performing printing on the first side.

Thereafter, the drawing unit 112 determines whether unprocessed pages, which are not yet laid out, remain in the document data (step S33), and if no unprocessed pages remain, ends the processing. If unprocessed pages remain, the drawing unit 112 produces the print data in which the remaining pages are laid out, for which the processing illustrated in FIG. 6 or 9 may be employed (step S34). Likewise the processing at step S13 in FIG. 6, the determination at step S33 is usually supposed to be NO. The processing performing if the determination is YES is regarded as error handling when the number of pages of the document exceeds the supposed number.

When the print data is produced by the processing described above, a printout can be obtained that forms a brochure by folding the sheet and is preferable for browsing the back side of the sheet by spreading the sheet as described with reference to FIGS. 7A, 7B, 8A, and 8B. In addition, even when pages that need to be laid out on the front side and pages that need to be laid out on the back side are mixed in the document edited in the application 101, users can lay out any page on the back side without performing operation to change the order of the pages. As a result, high operability can be achieved.

In the processing of FIG. 12, the pages cannot be sequentially laid out from a first page of the document. Hence, the drawing unit 112 needs to include a function that stores therein the document data of a plurality of pages and reads the data of each page in any order so as to provide the read data to the layout processing at step S31 or step S32. Alternatively, if the drawing unit 112 includes a function that produces the print data of a plurality of pages in parallel, this enables the pages to be laid out on the front side to be laid out on the front side and the pages to be laid out on the back side to be laid out on the back side sequentially from a first page of the document data.

Figure 13:
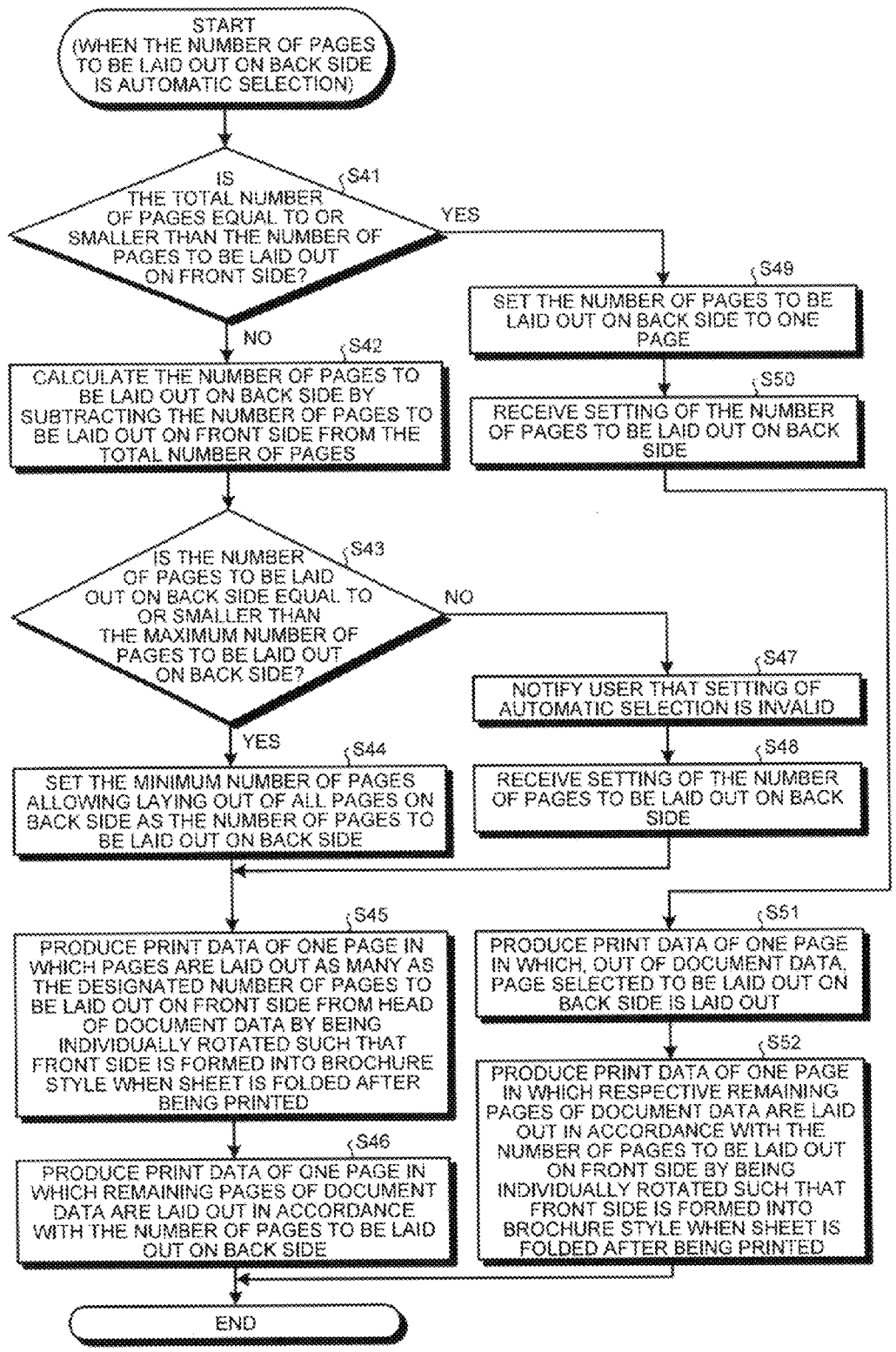
FIG. 13 is a flowchart of the print data generation processing performed by the drawing unit when an "automatic selection" is set as the number of pages to be laid out on the back side.

FIG. 13 illustrates a flowchart of processing when the "automatic selection" is set as the number of pages to be laid out on the back side. The drawing unit 112 starts to perform the processing illustrated in the flowchart of FIG. 13 upon determining that the special duplex printing is designated, and the "automatic selection" is set as the number of pages to be laid out on the back side as a result of analyzing the DEVMODE described with reference to FIG. 6. When the "automatic selection" is set, setting of the pages to be laid out on the back side in the detail setting screen 210 is disenabled.

In the processing of FIG. 13, first, the drawing unit 112 determines whether the total number of pages of the received data is equal to or smaller than the number of pages to be laid out on the front side (step S41). This determination is preferably done after all document data is received. If the determination is NO at step S41, the drawing unit 112 calculates the number of pages to be laid out on the back side by subtracting the number of pages to be laid out on the front side from the total number of pages (step S42), and determines whether the calculated number of pages is equal to or smaller than the maximum number of pages settable as the number of pages to be laid out on the back side (step S43).

If the determination is YES at step S43, this means that the number of pages is settable that allows laying out of all of the pages that cannot be laid out on the front side out of the document data. The drawing unit 112 sets the minimum number of pages allowing laying out of all of the pages that cannot be laid out on the front side and that are to be laid out on the back side as the number of pages to be laid out on the back side, out of the settable number of pages (step S44).

Thereafter, the drawing unit 112 produces the print data of one page in which the pages are laid out as many as the designated number of pages to be laid out on the front side from the head of the received data (step S45). In this layout, the respective images of the pages are rotated such that the sheet is formed into a brochure style when the sheet is folded after being printed. The produced print data is used for performing printing on the first side. In this flow, the number of pages to be laid out is supposed to be sufficient because the determination at step S41 is NO.

Then, the drawing unit 112 produces the print data of one page in which the remaining pages of the received document data are laid out in accordance with the number of pages to be laid out on the back side set at step S44 or step S48, which is described later, (step S46) and ends the processing. In this layout, all of the pages are laid out in the same orientation. When the number of pages to be laid out is smaller than the number of pages to be laid out on the back side, blank data corresponding to the lacking pages is laid out. The produced print data is used for performing printing on the second side.

If the determination is NO at step S43, this means that a setting allowing the laying out of all pages of the document data cannot be made. Thus, the drawing unit 112 activates the UI unit 111 so as to notify a user that the setting of the automatic selection is invalid (step S47) and receives a setting of the number of pages to be laid out on the back side (step S48). Then, the drawing unit 112 performs the layout at step S45 and step S46 in accordance with the received number of pages to be laid out, and ends the processing. In this case, pages remain that cannot be laid out. The document data of these pages is destroyed.

If the determination at step S41 is YES, this means that no page to be laid out on the back side remains if the pages as many as the number of pages to be laid out on the front side are laid out. Thus, the drawing unit 112 sets the number of pages to be laid out on the back side to one page, which is a minimum value (step S49), and activates the UI unit 111 so as to receive the selection of pages to be laid out on the back side (step S50).

Then, the drawing unit 112 produces, as the print data used for performing printing on the second side, the print data of one page in which the pages selected at step S50 out of the received document data is laid out (step S51). Thereafter, the drawing unit 112 produces the print data of one page in which the remaining pages in the received document data are laid out in accordance with the number of pages to be laid out on the front side (step S52), and ends the processing. In this layout, the respective images of the pages are rotated such that the sheet is formed into a brochure style when the sheet is folded after being printed. The produced print data is used for performing printing on the first side.

In the processing described above, the CPU 11 functions as an automatic setting unit at step S44. As a result of the processing described above, a printout can be obtained that forms a brochure by folding the sheet and is preferable for browsing the back side of the sheet by spreading the sheet as described with reference to FIGS. 7A, 7B, 8A, and 8B. The processing enables a document to be laid out on both sides of one sheet in a natural manner in accordance with the number of pages of the document data to be printed. As a result, when the document is made in the application 101, editing can be performed with a high degree of freedom and loose restrictions on the number of pages.

That is, when the number pages of the edited document differs from the supposed number of pages, the difference can be automatically absorbed by the number of pages to be laid out on the second side, thereby enabling the document to be made without much attention paid to the number of pages. When the number of pages to be laid out on the front side (first side) is changed, the change greatly influences the outer appearance or usage of a brochure because the layout is performed such that the front side formed into a brochure style when the sheet is folded. When the number of pages to be laid out on the back side (second side) is changed, the influence of the change on the outer appearance or usage of the brochure is relatively small because it is assumed that the back side is referred to by spreading the sheet. When the number of pages to be laid out per sheet is adjusted, it is preferable to adjust the number of pages to be laid out on the back side.

In the processing of FIG. 13, unlike the other processing, no processing is included that is performed when the document cannot be laid out on one sheet. However, when the pages not yet laid out remain after step S46, for example, the drawing unit 112 may return to step S41 and repeat the processing by regarding the remaining pages as the total pages.

Preview of a printout having different layouts (e.g., the number of collected pages and the order of the collection) on the front side and the back side of a sheet is described in detail below. When the previews of the printouts illustrated in FIGS. 7A, 7B, 8A, 8B, 10A, 10B, 11A, and 11B are displayed in the print preview 209 of the mode selection screen 200 without any change, the previews of two sides of the sheet are displayed in the print preview 209. That is, the previews of the two sides of the sheet are displayed in a limited area, thereby sometimes causing users to hardly estimate the print settings of both sides of the sheet.

In the embodiment, to display the print settings of both sides of the sheet in a limited area, the preview of the back side is displayed in such a manner that a number indicating the order in the collection is seen in a bleed-through manner from the front side. As an example of the bleed-through manner, a drawing such as a number on the back side is displayed in gray or lower density (thinner) than that of the front side as a resembling manner so as to be transparently seen from the front side.

Figure 14A:
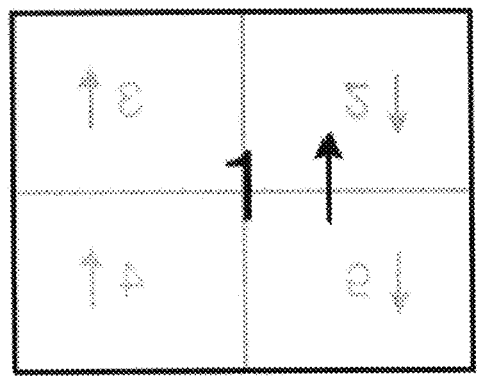
FIGS. 14A, 14B, 14C, and 14D are schematic diagrams illustrating first display examples of a preview of a sheet in which layout settings of the front and back sides are reflected and that is to be folded into a leaflet.
Figure 14B:
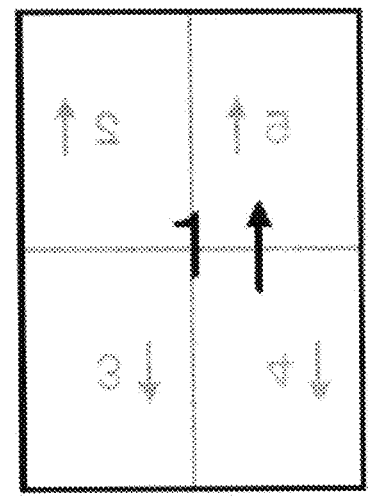
Figure 14C:
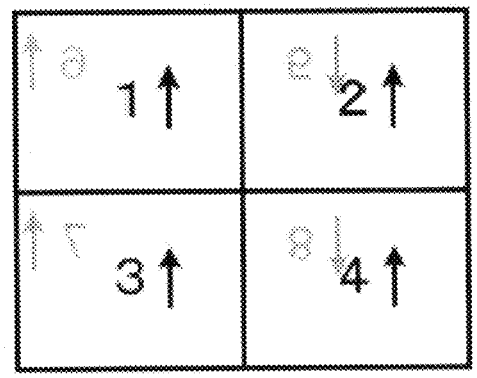
Figure 14D:
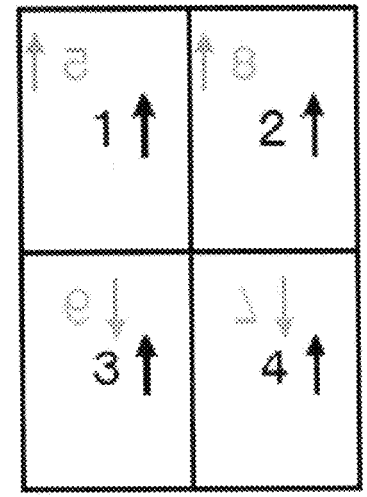

FIGS. 14A to 14D are schematic diagrams illustrating first display examples (images) of a sheet in which the layout settings of the front and back sides are reflected and that is folded so as to be formed into a leaflet style. FIG. 14A illustrates an image when the number of pages laid out on the front side is one, the number of pages laid out on the back side is four, and the layout is in landscape. FIG. 14B illustrates an image when the number of pages laid out on the front side is one, the number of pages laid out on the back side is four, and the layout is in portrait. FIG. 14C illustrates an image when the number of pages laid out on the front side is four, the number of pages laid out on the back side is four, and the layout is in landscape. FIG. 14D illustrates an image when the number of pages laid out on the front side is one, the number of pages laid out on the back side is four, and the layout is in portrait. The numbers in the figures indicate the respective page numbers of the document in the application 101. The arrows indicate the upward directions of the images in the respective pages. The directions of the page numbers indicate the directions of the images (up-down directions and left-right directions). The page numbers of the back sides are displayed so as to be seen in a bleed-through manner from the front sides.

FIG. 15 illustrates an example of a setting screen including a second display example of the preview of a sheet formed into a leaflet style when folded. FIGS. 16A to 16D are schematic diagrams illustrating the second display examples of the sheet in which layout settings of the front and back sides are reflected and that is formed into a leaflet style when folded. The UI unit 111 causes a display (not illustrated) to display a setting screen 250 illustrated in FIG. 15, for example. A print preview 252, which is included in the setting screen 250 and corresponds to the print preview 209 illustrated in FIG. 4, displays the second display examples of the preview of the sheet illustrated in FIGS. 16A to 16D.

Figure 16A:
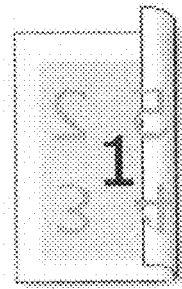
FIGS. 16A, 16B, 16C, and 16D are schematic diagrams illustrating the second display examples of the preview of the sheet in which layout settings of the front and back sides are reflected and that is to be folded into a leaflet.
Figure 16B:
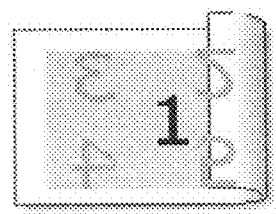
Figure 16C:
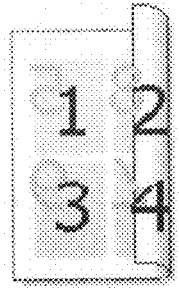
Figure 16D:
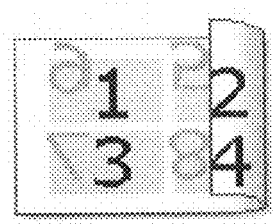

FIG. 16A illustrates an image when the number of pages laid out on the front side is one (front 1 in 1), the number of pages laid out on the back side is four (back 4 in 1), and the sheet is in portrait. FIG. 16B illustrates an image when the number of pages laid out on the front side is one (front 1 in 1), the number of pages laid out on the back side is four (back 4 in 1), and the sheet is in landscape. FIG. 16C illustrates an image when the number of pages laid out on the front side is four (front 4 in 1), the number of pages laid out on the back side is four (back 4 in 1), and the sheet is in portrait. FIG. 16D illustrates an image when the number of pages laid out on the front side is four (front 4 in 1), the number of pages laid out on the back side is four (back 4 in 1), and the sheet is in landscape. The numbers in the figures indicate the respective page numbers of the document in the application 101. The image areas on the front sides of the respective pages are indicated in gray (low density). The directions of the page numbers indicate the directions of the images (up-down directions and left-right directions). The page numbers of the back sides are displayed so as to be seen in a bleed-through manner from the front sides.

When the front and back sides of a sheet have the same layout, users can know the settings of the collective printing performed as the duplex printing from the preview of the front side. However, when the page layout differs in the front and back sides such as a leaflet fold, users cannot confirm the settings of the special duplex printing such as the leaflet fold unless the users know information on both of the front and back sides. The following exemplary manners may be used to indicate the information on both of the front and back sides: the back side is displayed so as to be transparently seen from the front side, the back side is displayed with an icon, the back side of the sheet and the front side of the sheet are displayed side by side, and characters or symbols indicating the special duplex printing are added. The manner of displaying the back side so as to be transparently seen from the front side as employed in the embodiment enables users to know the page layouts of the front and back sides simultaneously even though the preview area is small.

The page layout of the back side may be displayed in any manner that expresses the difference from the page layout of the front side, such as using a thinner color or in a left-right mirror-reversed layout. When the indicators of the page layouts of the front and back sides overlap with each other, the indicators are displayed by being shifted to reduce the overlapping area as illustrated in FIGS. 14A to 14D and 16A to 16D. The reduction of the overlapping area of the indicators can improve user's visibility.

FIG. 17 is a flowchart illustrating an example of processing performed by the UI unit 111 to display the previews when the front side and the back side of a sheet have different layouts (e.g., the number of collected pages and the order of the collection). When the number of collected pages and the order of the collection differ in the front and back sides of the sheet, the UI unit 111 causes a drawing on the back side to be transparently seen from the front side (step S61). For example, the UI unit 111 regards the respective page numbers of a document as the drawings on the respective pages. The UI unit 111 performs processing such as reversing the page numbers left and right (up and down) in accordance with the page layout of the back side and thinning the color of the page numbers on the back side.

Then, the UI unit 111 determines whether the positions of the drawings on the front and back sides overlap with each other (step S62). If the positions of the drawings overlap with each other (YES at step S62), the UI unit 111 shifts the drawing positions so as to reduce the overlapping of the drawings on the front and back sides (step S63). If the positions of the drawings do not overlap with each other (NO at step S62), the UI unit 111 proceeds to the processing at S64.

Then, the UI unit 111 draws the drawing on the back side on the preview screen (step S64) and draws the drawing on the front side on the preview screen (step S65). In a small overlapping area of the drawings on the front and back sides, the drawing on the front side is more noticeable than that of the back side because the drawing on the front side is drawn on that of the back side. In this way, the UI unit 111 functions as a preview data generating unit that produces preview data for displaying a preview corresponding to the print data produced by the drawing unit 112.

In the invention whose embodiments have been described, the specific structures of components, the contents of processing, the contents of screens, the settable items, and the options are not limited those described in the embodiment. For example, the layout of the front side may be selected so as to be formed into an open-to-top, open-to-left, or open-to-right brochure. For another example, the layout order of the respective pages may be selected when a plurality of pages are laid out on the back side. The options of the number of pages to be laid out are not limited to those illustrated in FIG. 5.

In the embodiment, the pages are laid out on the front side by being individually rotated such that only the pages laid out on the front side are formed into a brochure style whereas the pages that are laid out on the back side have the same orientation. The layout, however, is not limited to being performed in this manner. The invention can be applied to a case when a layout is performed without paying attention to making a brochure or without paying attention to brows a sheet by spreading the sheet. In such a case, the invention can perform the special duplex printing in which the page layout manner differs in the first and second sides. As a result, the convenience of laying out pages in the duplex printing can be improved.

A print control program of the invention causes the CPU 11 of the computer terminal 10 of the embodiment to achieve the functions of the printer driver 110. The effects described above can be achieved by causing the computer to execute the program.

The program may be preliminarily stored in a storage unit, such as a ROM, included in the computer. Alternatively, the program may be recorded in a CD-ROM serving as a recording medium or in a non-volatile recording medium (memory) such as a flexible disk, a static RAM (SRAM), an electrically erasable and programmable ROM (EEPROM), and a memory card, and provided. The program recorded in the memory is installed into the computer and the computer causes the CPU to execute the program. As a result, the processing described above can be performed.

Furthermore, the program can be downloaded to the computer from an external apparatus including a recording medium recording therein the program or an external apparatus including a storage unit storing therein the program, both of which are connected to a network, and the computer causes the CPU to execute the program. The embodiment, the operation example, and the modification described above can be performed in any combination of them without inconsistency among them.

The structure described above can enhance the convenience of laying out the pages in the duplex printing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory computer-readable recording medium including computer-readable instructions that when executed by a computer causes the computer to implement a method comprising:
   receiving document data of a plurality of pages to be printed;
   receiving a special duplex printing instruction that specifies a first number of pages to be laid out on a first side of a sheet and a second number of pages to be laid out on a second side of the sheet in a setting information used for performing printing; and
   producing print data in which the first number of pages are laid out on the first side of the sheet and the second number of pages are laid out on the second side of the sheet for causing a printing apparatus to print the received document data when the special duplex printing instruction is set in the setting information, wherein
   the first number of pages are laid out on the first side of the sheet such that at least one predetermined page and other pages, among the first number of pages, are laid out in different orientations from each other on the first side of the sheet, and
   in setting of the special duplex printing instruction, a number for the first number of pages to be laid out on the first side of the sheet is individually settable from a first plurality of options, and a number for the second number of pages to be laid out on the second side of the sheet is individually settable from a second plurality of options.

2. The non-transitory computer-readable recording medium according to claim 1, wherein the second number of pages to be laid out on the second side of the sheet is automatically set to a value allowing laying out of all pages exceeding the first number of pages to be laid out on the first side of the sheet out of the plurality of pages of the document data on the second side of the sheet based on a number of pages of the document data and a setting of the first number of pages to be laid out on the first side of the sheet when producing the print data relating to the special duplex printing instruction.

3. The non-transitory computer-readable recording medium according to claim 1, wherein, out of the plurality of pages included in the document data to be printed, a given number of beginning pages are laid out on the second side of the sheet and remaining pages are laid out on the first side of the sheet in accordance with settings of the first number of pages and the second number of pages to be laid out on the first side of the sheet and the second side of the sheet, respectively, when producing the print data relating to the special duplex printing instruction.

4. The non-transitory computer-readable recording medium according to claim 1, wherein, out of the plurality of pages included in the document data to be printed, a preliminarily designated page is laid out on the second side of the sheet and remaining pages are laid out on the first side of the sheet, when producing the print data relating to the special duplex printing instruction.

5. The non-transitory computer-readable recording medium according to claim 1, wherein
   the at least one predetermined page and the other pages are laid out in said different orientations from each other such that only the first side of the sheet is formed into a brochure style when the sheet is folded after being printed, and
   the second number of pages are laid out on the second side of the sheet such that all of the second number of pages are laid out in a same orientation.

6. The non-transitory computer-readable recording medium according to claim 1, further comprising:
   producing preview data such that a preview corresponding to the print data is displayed in such a resembling manner that a drawing on the second side of the sheet is transparently seen from the first side of the sheet, when the special duplex printing instruction is set in the setting information.

7. The non-transitory computer-readable recording medium according to claim 6, wherein, when the drawing on the second side of the sheet and another drawing on the first side of the sheet in the preview data overlap with each other, the preview data is produced by shifting positions of the drawing and the another drawing so as to reduce overlapping of the drawing and the another drawing.

8. The non-transitory computer-readable recording medium according to claim 6, wherein
   page numbers are set as the drawing and another drawing on respective pages, and
   a first density of the drawing on the second side of the sheet is set to be lower than a second density of the another drawing on the first side of the sheet such that the drawing on the second side of the sheet is transparently seen.

9. The non-transitory computer-readable recording medium according to claim 1, wherein the number for the first number of pages laid out on the first side of the sheet is different from the number for the second number of pages laid out on the second side of the sheet.

10. The non-transitory computer-readable recording medium according to claim 1, wherein, in setting of the special duplex printing instruction, document orientations of the first side of the sheet and the second side of the sheet are individually settable to a portrait orientation or a landscape orientation.

11. The non-transitory computer-readable recording medium according to claim 10, wherein the document orientations of the first side of the sheet and the second side of the sheet that are individually settable to the portrait orientation or the landscape orientation are displayed on a single setting screen.

12. The non-transitory computer-readable recording medium according to claim 1, wherein the first plurality of options and the second plurality of options are displayed on a single setting screen.

13. An information processing apparatus that produces print data for causing a printing apparatus capable of performing duplex printing to perform printing, the information processing apparatus comprising:
   circuitry configured to:
   receive document data of a plurality of pages to be printed;
   receive a special duplex printing instruction that specifies a first number of pages to be laid out on a first side of a sheet and a second number of pages to be laid out on a second side of the sheet in a setting information used for performing printing; and
   produce the print data in which the first number of pages are laid out on the first side of the sheet and the second number of pages are laid out on the second side of the sheet for causing the printing apparatus to print the received document data when the special duplex printing instruction is set in the setting information, wherein
   the first number of pages are laid out on the first side of the sheet such that at least one predetermined page and other pages, among the first number of pages, are laid out in different orientations from each other on the first side of the sheet, and
   in setting of the special duplex printing instruction, a number for the first number of pages to be laid out on the first side of the sheet is individually settable from a first plurality of options, and a number for the second number of pages to be laid out on the second side of the sheet is individually settable from a second plurality of options.

14. The information processing apparatus according to claim 13, wherein the circuitry is configured to automatically set the second number of pages to be laid out on the second side of the sheet to a value allowing laying out of all pages exceeding the first number of pages to be laid out on the first side of the sheet out of the plurality of pages of the document data on the second side of the sheet based on a number of pages of the document data and a setting of the first number of pages to be laid out on the first side of the sheet when producing the print data relating to the special duplex printing instruction.

15. The information processing apparatus according to claim 13, wherein the circuitry is configured to lay out, out of the plurality of pages included in the document data to be printed, a given number of beginning pages on the second side of the sheet and remaining pages on the first side of the sheet in accordance with settings of the first number of pages and the second number of pages to be laid out on the first side of the sheet and the second side of the sheet, respectively, when producing the print data relating to the special duplex printing instruction.

16. The information processing apparatus according to claim 13, wherein the circuitry is configured to lay out, out of the plurality of pages included in the document data to be printed, a preliminarily designated page on the second side of the sheet and remaining pages on the first side of the sheet, when producing the print data relating to the special duplex printing instruction.

17. The information processing apparatus according to claim 13, wherein
   the at least one predetermined page and the other pages are laid out in said different orientations from each other such that only the first side of the sheet is formed into a brochure style when the sheet is folded after being printed, and the second number of pages are laid out on the second side of the sheet such that all of the second number of pages are laid out in a same orientation.

18. The information processing apparatus according to claim 13, wherein the circuitry is configured to produce preview data such that a preview corresponding to the print data is displayed in such a resembling manner that a drawing on the second side of the sheet is transparently seen from a front the first side of the sheet, when the special duplex printing instruction is set in the setting information.

19. The information processing apparatus according to claim 13, wherein, in setting of the special duplex printing instruction, document orientations of the first side of the sheet and the second side of the sheet are individually settable to a portrait orientation or a landscape orientation.

20. A printing system comprising a printing apparatus and an information processing apparatus that produces print data for causing the printing apparatus capable of performing duplex printing to perform printing, wherein the information processing apparatus comprises:
    circuitry configured to:
    receive document data of a plurality of pages to be printed;
    receive a special duplex printing instruction that specifies a first number of pages to be laid out on a first side of a sheet and a second number of pages to be laid out on a second side of the sheet in a setting information used for performing printing; and
    produce the print data in which the first number of pages are laid out on the first side of the sheet and the second number of pages are laid out on the second side of the sheet for causing the printing apparatus to print the received document data when the special duplex printing instruction is set in the setting information, wherein
    the first number of pages are laid out on the first side of the sheet such that at least one predetermined page and other pages, among the first number of pages, are laid out in different orientations from each other on the first side of the sheet, and
    in setting of the special duplex printing instruction, a number for the first number of pages to be laid out on the first side of the sheet is individually settable from a first plurality of options, and a number for the second number of pages to be laid out on the second side of the sheet is individually settable from a second plurality of options.

* * * * *